Dec. 8, 1942.  D. D. WILE  2,304,292
REFRIGERATOR CABINET CONSTRUCTION
Filed May 10, 1940  2 Sheets-Sheet 1
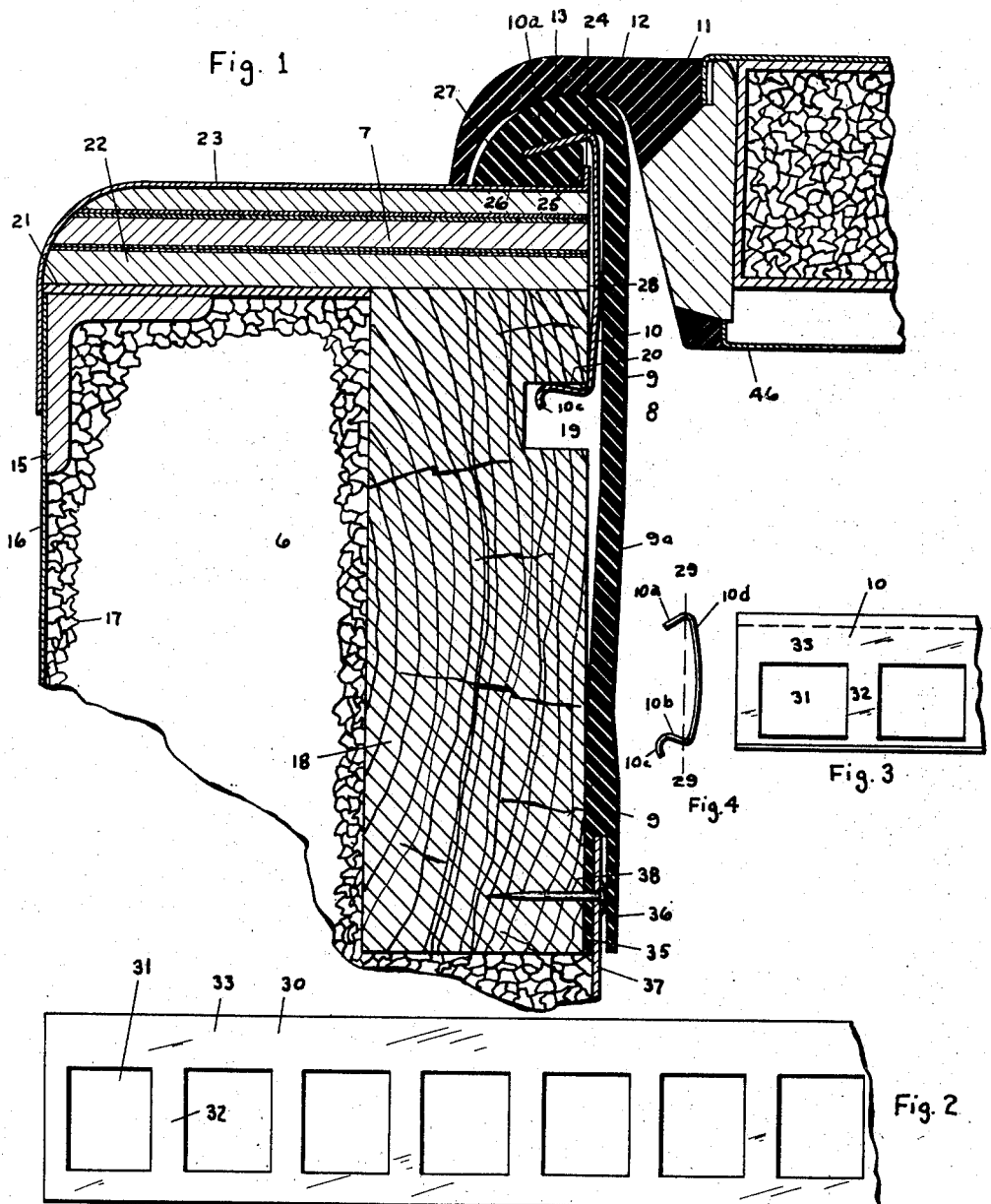
INVENTOR
DANIEL D. WILE
BY Martin & Rendell
ATTORNEYS

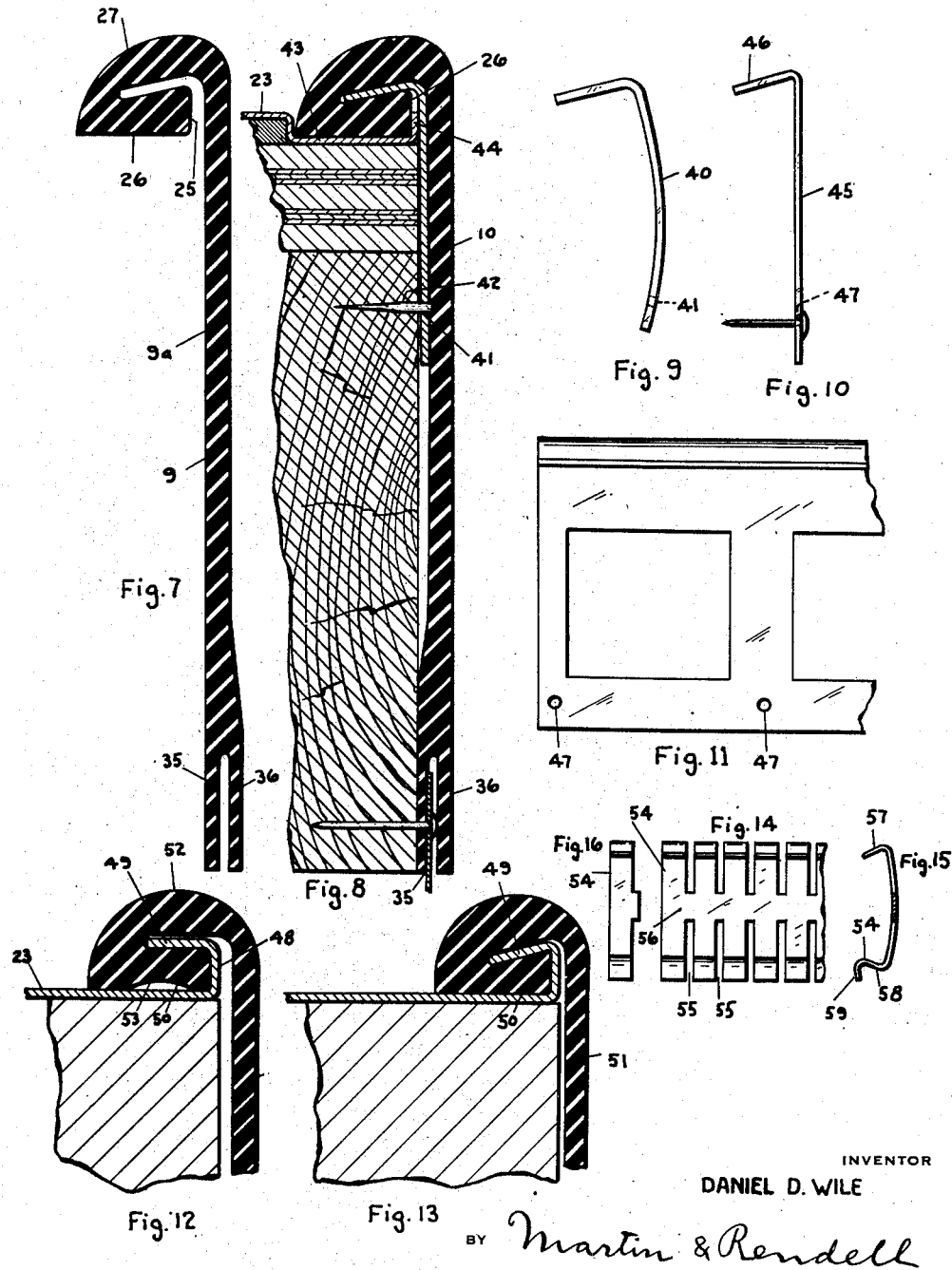

Patented Dec. 8, 1942

2,304,292

UNITED STATES PATENT OFFICE 2,304,292

REFRIGERATOR CABINET CONSTRUCTION

Daniel D. Wile, Utica, N. Y., assignor to Savage Arms Corporation, New York, N. Y., a corporation of Delaware Application May 10, 1940, Serial No. 334,365

5 Claims. (Cl. 220—9)

My present invention relates to refrigerating cabinets and the like, and particularly to the so-called breaker strip or throat rubber construction therefor including therein the rubber-like breaker strips and the means for fastening said breaker strips or throat rubbers in place about the apertures of the cabinet.

The purpose of this invention is to provide a breaker strip or throat rubber construction of new and improved form and including thereunder a new and improved construction of throat rubber so constructed as to be especially well adapted to be combined with a new form of fastening device for holding the throat rubber in place about the aperture of the cabinet.

A further specific purpose of the invention is to provide a throat rubber having at its edge that is to be adjacent the edge of the aperture of the cabinet a double-layered loop having its outer layer projecting across the adjacent portion of the outer surface of the cabinet but spaced therefrom and having its inner layer extending from the outer edge of said outer layer of the loop back towards the main portion of the throat rubber so that there is formed a pocket between the two layers of said loop of the throat rubber into which pocket may be readily inserted the hooked end of a fastener embodying the other cooperating part of my invention.

A further purpose of this invention is to provide a fastening member which is of new and improved construction and especially well adapted to be combined with the above described throat rubber so as to hold the inner layer of the double-layered loop of the throat rubber against the adjacent outer surface of the refrigerating cabinet.

A further purpose is to provide is to provide a construction of the type above mentioned where the throat rubber and fastening member therefor are of new and improved construction and combination of said parts, and which construction is economical in original construction, readily assembled or taken apart when required, and durable and effective in operation in that the throat rubber effectively prevents the transmission of heat across the part spanned by the breaker strip or throat rubber.

A further specific purpose is to provide for use with my described form of throat rubber a resilient fastening member of C-shaped cross sectional form so constructed, and so cooperating with the cabinet that the fastening member may be sprung into place and will hold itself in place without relying upon the elasticity of the throat rubber to provide the tension for holding the said throat rubber and holding member in place.

A further purpose is to provide a holder that by its own tension, not only holds itself and the throat rubber to the cabinet but also presses the adjacent top metal layer of the cabinet down against the wood or other material below the top metal layer.

Further purposes and advantages of this invention will appear from the specification and claims herein.

Fig. 1 is a vertical sectional view on a somewhat enlarged scale of the portion of a refrigerating cabinet adjacent its aperture and the lid therefor, which cabinet is equipped with a throat rubber and fastening device therefor embodying the preferred form of this invention.

Fig. 2 is a plan view of a part of a strip of resilient material, preferably sheet metal, as first formed or stamped and cut out of a flat piece of material, and showing the first step in the manufacture of units of lengths of throat rubber fastening devices embodying this invention, as shown in Fig. 1.

Fig. 3 is a plan view of a short piece of the material shown in Fig. 2 after it has been bent transversely of its width so as to form without any more steps completed units or lengths of my fastening devices according to this invention, as shown in Figs. 1 and 2.

Fig. 4 is an end view of the strip of material after it is shaped as described in Fig. 3.

Fig. 5 is a top view on a much reduced scale of a throat rubber arranged in elongated rectangular shape to fit an aperture in a refrigerating cabinet, the position of the holder units being indicated by long dash lines.

Fig. 6 is a similar view of a throat rubber arranged in a square to fit a square aperture.

Fig. 7 is a sectional view transversely of a throat rubber formed pursuant to the preferred form of this invention.

Fig. 8 is a sectional view of a throat rubber and the adjacent portion of a refrigerating cabinet showing a modified form of the invention as to the construction of the upstanding flange at the edge of the aperture and as to the form of the fastening device.

Fig. 9 is a transverse sectional view of a resilient form of fastener having no second hook.

Fig. 10 is an end elevation of a hooked fastener of non-resilient type.

Fig. 11 is a plan view of a portion of the fastener shown in Fig. 10.

Fig. 12 is a sectional view of the upper end of a throat rubber and the adjacent part of a cabinet illustrating a still different way of fastening the pocketed upper end of the rubber to the cabinet.

Fig. 13 is a view similar to Fig. 12, when the overhanging flange is pressed down to render the assemblage more permanent.

Fig. 14 is a plan view of a narrow hooked fastener adapted to be used at the angle or curve between two longer straight units of a regular fastening member, and Fig. 15 is an edge view thereof. Fig. 16 is a plan view of a strip of metal formed to make said narrow hook fasteners but before the strip is broken into its separate fasteners, in which unbroken shape it can be used for making a relatively long curve.

Referring to the drawings in a more particular description and first to the invention as shown in Figs. 1–3, it will be seen that Fig. 1 shows on a somewhat enlarged scale a vertical section through one side wall 6 and the top 7 of that wall adjacent the loading aperture 8 of a refrigerating compartment equipped with my form of throat rubber 9, and also a throat rubber holding device 10 embodying this first and preferred form of my invention. Said view also shows the adjacent portion of a lid 11 used to cover and close the aperture 8, and having an overhanging lip 12 engaging the uppermost part 13 of the throat rubber.

In Fig. 1 of the drawings I have illustrated a form of side wall and top of a refrigerator cabinet, but it will be understood that the details of this description are not to be taken as limiting the scope of my invention, but simply as illustrating a form of refrigerating cabinet equipped with a throat rubber and a throat rubber holding device embodying this invention. As shown in the drawings the side wall of this refrigerating unit or cabinet consists of a top frame member 15 ordinarily of angle iron construction to give the necessary strength to the top outer edge of the cabinet, and depending along the outer wall and beyond the corner member 15 is a removable panel 16 covering the whole side preferably, or a considerable portion of a side, of the cabinet. Within the panel the side wall 6 has the proper mass of insulation 17 of cork or suitable similar material. Adjacent the inner surface of the wall there is provided a top reenforcement 18 of proper thickness and extending down the proper distance for its lower edge to be about opposite the lower edge of the throat rubber 9. This reenforcement 18 is preferably of wood or the like and in the construction shown in Fig. 1 is provided a little distance down from its top and on its inner side with an inwardly extending rabbet or recess 19 having its top face 20 horizontal in the case of a horizontally arranged refrigerating cabinet such as that intended to be illustrated by Fig. 1. In some forms of cabinet the recess may be in the upper part of the member 18, its upper face being the lower side of member 22.

Above the corner frame member 15 and above the top of the insulation 17 is a layer of so-called gum sealer 21 reaching to the outer side of the top reenforcement 18 adjacent its top. Above this gum sealer and the upper face of the top reenforcement 18 is arranged a plywood sub-top 22 and over the top of this is preferably arranged a proper layer of stainless steel forming the top 23, the outer end or edge of which preferably extends over the outer curved edge of the plywood 22 and over the angular frame member 15 and over the upper portion of the panel 16. The inner edge of the stainless steel top 23 extends at least to the inner edge of the plywood sub-top 22 and is there provided with a short upturned flange 24. This upturned flange of the top 23 serves to positively and permanently locate the inner face 25 of the pad portion 26 provided at the outer extremity of the curved hook portion or double-layered loop 27 at the top of the main straight portion 9ª of the throat rubber 9. Said pad portion 26 of the throat rubber 9 has its lower face resting directly upon the upper surface of the stainless steel top 23 and reaching horizontally from the outer face of the flange 24 outwardly the proper distance so as to afford a slightly compressible or yielding support for a portion of the upper hook 10ª of the throat rubber holder 10. As already intimated this throat rubber holder 10 is, in this type of my invention, formed of resilient material such as resilient metal of the proper strength, and with the different lengths or units of said holder 10 shaped transversely through the main band 10ᵈ of the holder into a curve going outwardly with reference to the adjacent inner side wall 28 of the refrigerator cabinet or going to the right with reference to the vertical dotted line 29 of Fig. 3.

The lower edge of each length of throat rubber holder 10 is, in the preferred form of my invention, provided with an inwardly turning hook 10ᵇ, the extremity of which however is turned down first at a slight curve and then straight down with reference to the hook porttion 10ᵇ, thus forming a downturned flange 10ᶜ, as best shown in Fig. 4.

It will be understood of course that the throat rubber 9 will be commonly formed as a continuous circuit or belt extending around the aperture 8 of the cabinet. The lengths or pieces of the throat rubber holder 10 may be as long as desired but of course in practice with the standard unit thereof of such length that one length of the holder 10 will cover practically the full extent of the throat rubber at the two short ends of the usual rectangular opening in a refrigerating cabinet while two standard lengths thereof will reach along each of the two long sides of the opening. In Fig. 5 is shown in diagrammatic form a top view of a continuous throat rubber arranged in position to go around the said usual rectangular aperture in a refrigerating cabinet. In this view the full lines represent a top view of the throat rubber 9 while the different units or standard lengths of the throat rubber holder 10 are represented by the long-dash lines.

In Fig. 6 there is shown in a similar way a throat rubber 9 arranged about a substantially square aperture for a refrigerating cabinet. One unit of standard length of the throat holder 9 in this case extends along each side of the throat rubber in its square formation to fit the square aperture in the cabinet.

Fig. 2 is a plan view of one end of a strip 30 of suitable resilient metal of proper width for a unit after such strip has been stamped or otherwise manipulated by proper machinery to have therein the rectangular crosswise extending holes 31, leaving therebetween narrow bands 32 connecting the wider zone 33 left along one side of the strip 31 to the somewhat narrower zone 34. These strips 30, either as strips of indefinite length or after said long strips have been cut into the desired standard length for the different sizes of holders 10 are then bent, stamped, pressed, rolled or otherwise shaped to produce three results: first, the upper hook 10ª already mentioned along the outer edge of the wider zone 33, and second, so as to produce the reversely bent or curved lower hook consisting of the hook portion 10$^b$ and therebeyond the flange 10$^c$, and thirdly to bend the whole remaining intervening zone of the strip between the upper hook 10$^a$ and the lower hook 10$^b$ into a curved shape or form 10$^d$ more or less as best shown in Fig. 4, with the curve extending away from the hooks 10$^a$ and 10$^b$. This lower hook consisting of said two parts, the hook proper 10$^b$ and the flange 10$^c$, is formed preferably entirely from the narrow band 34. The cutting away of the metal from the central zone of the original strip 30 is for the purpose primarily of reducing the transmission of heat from the upper or outer part of the holder through to its lower or inner part; it also allows the use of a sufficiently heavy strip of the resilient material to get the required strength in the hooked edges of the holder while still having a holder of sufficient resiliency through its central zone to allow the holder to be readily placed in position.

It will be understood that a throat rubber 9 will be assembled upon a cabinet by first placing the upper hook of a holder into the pocket of the throat rubber and then placing the pad portion 26 of the throat rubber down upon the top 23 immediately outside of the flange 24, and then pressing the main portion of the holder towards the adjacent wall of the aperture, preferably by pressure placed against the chamber side of the main part of the throat rubber until the lower hook of the holder snaps into the recess 19 and into engagement with the upper surface 20 thereof. The other parts of the throat rubber will be successively placed in position by following the same procedure until the whole circuit of a throat rubber is applied to the walls of the aperture. The springing of the holder into place will obviously flex the curved portion of the holder somewhat, but enough tension will be retained by the different holder units to hold the throat rubber in place.

The backturned flange 10$^c$ on the outer extremity of the lower hook 10$^b$ produces a rounding edge at the inner extremity of the hook portion proper 10$^b$, so that there will not be a raw or cutting edge to dig into the wood or other material forming the upper face 20 of the recess 19. If it were not for the rounding edge formed by the turning down of this flange 10$^c$ it would be much more difficult, if not impossible, for the workman to easily put the holders 10 in their desired place, as the spring action of the holder would tend to press the inner edge of the lower hook against the wood of the face 20 before the said hook had been properly housed as far as possible within the said recess 19.

Ordinarily the throat rubber to be used in a cabinet of the type herein above referred to will have its lower end formed with two separate but closely adjacent layers as 35, on the inner side immediately next to the inner wall 28 of the side wall 6, and the other or outer portions 36 away from said wall. This allows for a convenient arrangement of bringing up into this space the upper edge or zone of the metal or other proper lining 37 of the refrigerator cabinet, and fastening it in that position as by nails, tacks, screws or the like 38 extending through the upper portion of the inner lining 37 and then through the inner layer 35 of the throat rubber and then into the wood or other material of the side wall 6 of the cabinet. The other portion 36 of the throat rubber, called the outer portion, is farther away from the inner surface 28 of the wall 6 of the cabinet. This outer flap 36 having been originally formed parallel to the flap 35 still naturally hangs downwardly and forms a protection over the upper joint of the cabinet lining 37 and also over the heads of the nails or other fasteners 38, and so protects all these parts from liquid in use of the device and even from liquid having access to these parts when the cabinet is washed.

After the skirt or lower end of the throat rubber has been loosened from the adjacent wall of the cabinet if it was tacked thereto, a unit of such a C-shaped spring holder can be readily detached from the cabinet by inserting the point of a screw driver back of one end of a fastener or even back of one connection bar 32 and prying it outwardly.

It is to be particularly noted that the C-shaped holders herein shown have such a combination of resiliency that they can be sprung into position during assembling and stay in position without losing their resilience. The units of spring clamps 10 can ordinarily be reinserted and used over and over again.

The pad portion 26 of the throat rubber increases in thickness as it proceeds away from its junction with its arched portion 27 and approaches the upwardly extending flange 24, and in this way the hook portion 10$^a$ engages this pad portion not only at the extremity of the hook 10$^a$ but for some distance back from the end of the hook the material of the hook of the holder bears flatwise against a considerable area of the upper surface of said pad portion. This construction obviates damage to the throat rubber and to the hooked upper end of the fastener by the upper part of the throat rubber being struck by an object, such as a dipper or a can of ice cream.

Fig. 7 is a transverse sectional view through a throat rubber embodying this invention, shown separately and apart from either the fastener or the adjacent part of the refrigerating cabinet.

Fig. 9 is a transverse sectional view through a modified form of resilient fastening member 40, the modification of the preferred form of fastener being that in this form of fastener the lower end of the fastener does not have a hook but may be fastened by other means to the cabinet, as for example by being provided with a series of holes 41 near the lower edge of the fastener, which holes may be brought into engagement with pins 42 already placed in position in the aperture wall of the cabinet as shown in Fig. 8. Such pins or headed nails may be inserted through the said holes 41 into the wall of the cabinet after the fastener has been put in place upon the throat rubber.

Fig. 8 shows a further modification of my invention, in that instead of the flange 24 projecting above the general level of the whole top 23 as shown in Fig. 1, I may provide a depressed portion 43 adjacent the aperture and below the general level of the top 23, with the upstanding flange 44 at the edge of the aperture and projecting upwardly only to about the level of the top 23. The depressed portion 43 will be wide enough to receive the pad portion 26 forming the lower layer of the double-layered loop at the top of the throat rubber, approximately as shown in Fig. 8.

Figs. 10 and 11 show a further modification in the holding member in that this holding member 45 has an outwardly projecting hook 46 at its upper end more or less like the hook portion 10$^a$ of the fastener shown in Fig. 4, but this fastener 45 is of rigid instead of resilient material and its main length depends from its hooked end 46, in a straight line and near its lower end it is provided with a series of holes 47 therethrough by means of which this fastening strip can be securely held by means of headed nails having their shanks projecting through these holes, as shown in Fig. 10.

In Figs. 12 and 13 is shown a further modification of the throat rubber and of the means for holding it in place upon the edge of the aperture of the cabinet. In this modification the top 23 of the cabinet has an upstanding flange 48, and from the upper end of this flange there is a further flange 49 turned outwardly or back parallel to the top 23 but spaced therefrom far enough to receive thereinto the pad portion 50 of the throat rubber 51. The throat rubber is placed in position in this construction as shown in Fig. 12, with the outwardly turned flange 49 extending into the pocket formed above the pad 50 and beneath the upper layer 52 of this throat rubber. Preferably the lower surface of the pad 50 will be hollowed out or formed with a concave lower surface as at 53. Then by placing a length of board, or other proper member over the top surface of the upper layer 52 of the throat rubber and providing a sufficient downward pressure on said board the pressure will be transmitted through the layer 52 of the throat rubber down against the flange 49, and said flange will be pressed downwardly, bringing the parts approximately to the position shown in Fig. 13. This downward pressure of the flange 49 is more readily performed when the face at the bottom of the pad 50 is concave. The thickening of the pad portion 50 as it extends to the upstanding flange 48, in an obvious manner will cooperate with the now downturned flange 49 to permanently hold the upper end of the throat rubber in place, as shown in Fig. 13.

Obviously the flanged or bent edges of my fastening member 10, as shown in Figs. 3 and 4, and also in Fig. 1, do not permit of said fastener member being bent around the corner or slight curve connecting one side of an aperture to an adjoining side of the aperture. In some cases it is advisable to provide shorter units of a fastening member to hold the throat rubber at such connecting angles or curves. For this purpose I provide a relatively narrow hooked fastener 54, a plan view of which is shown in Fig. 14 and an edge view in Fig. 15. These narrow fastening members are conveniently formed by punching a strip of the proper material into the form shown in Fig. 16, wherein slots 55 have been cut, punched or otherwise formed extending in from the opposite edges of the strip of metal. The strip so cut can be readily separated into its different parts 54 by breaking the metal at the connecting parts 56. It will be understood that the slotted strips of metal shown in Fig. 16 will be subjected to the same punching or bending operation as was the strip shown in Fig. 3, so as to form the top hook 57 on the members 54, and the bottom hook 58 with its connecting rounded flange 59. The strip with its slots cut in from both edges but without being broken at its connection parts can be used as a fastener to go around a curve.

What I claim is:

1. In combination, a refrigerating cabinet having an aperture through its top wall and having a low upstanding ridge about the edge of said aperture and extending above the level of the top of the cabinet, a throat rubber extending about said aperture and having its body portion extending inwardly about the inwardly extending face of the aperture and having a double-layered loop projecting from the upper edge of said body portion laterally over the top surface of the cabinet adjacent the aperture, said loop having its upper layer extending outwardly from the top of the said body of the throat rubber with the second layer therebelow and extending from the outer edge of said upper layer laterally along the top of the cabinet and forming a laterally-extending pocket between said layers with the opening thereinto near the upper portion of the body of said throat rubber, a detachable resilient clamp having a hook at its upper part projecting into said lateral pocket with the main part of the clamp extending down below said pocket between the body of the throat rubber and the adjacent face of the aperture and means for detachably connecting the lower part of said clamp to the cabinet, said upstanding ridge on the top of the cabinet about said aperture forming a stop for the inner free edge of the inner flange on said throat rubber.

2. In combination, a refrigerating cabinet having an aperture through one wall thereof, the inner side of said wall having a shoulder spaced from the adjacent outer surface thereof and facing away therefrom, a throat-rubber extending about said aperture and extending inwardly along the wall of said aperture and having a double-layered hook-like outer end, the inner layer of which hook bears against the outside of the cabinet adjacent the said aperture, and a C-shaped resilient clamp having a hook at one end projecting into the space between the said two layers of the hook-like outer end of the throat rubber and pressing said inner layer of the throat rubber against the outer surface of the cabinet, the central portion of the clamp extending between the next adjacent part of the throat rubber and the wall of the aperture and the other or inner hooked end of the clamp being sprung into engagement with said shoulder, the resiliency of said clamp retaining said clamp and the outer end of said throat-rubber in place.

3. In combination, a refrigerating cabinet having an aperture through one wall thereof, the inside face of said wall having a shoulder spaced from the adjacent outer face thereof and facing away therefrom, and substantially parallel thereto, a throat rubber extending about said aperture and extending inwardly along the wall of said aperture and having a double-layered hook-like outer end, the inner layer of which hook-shaped end bears against the outside of the cabinet adjacent the said aperture, and a C-shaped resilient clamp having its hook at one end projecting into the space between the said two layers of the hook-like outer end of the throat rubber and pressing said inner layer of the throat rubber against the outer face of the cabinet, the central portion of the clamp extending between the next adjacent part of the throat rubber and the wall of the aperture and the other or inner hooked end of the clamp being sprung into engagement with said shoulder, the resiliency of said clamp retaining said clamp and the end of the throat rubber in place.

4. In combination, a refrigerating cabinet having an aperture through one wall thereof and having a recess in the inner side of said wall spaced from the adjacent outer face of said wall, the face of said recess towards the outside of the cabinet being substantially at right angles to the adjacent inner face of said wall, a throat rubber extending about said aperture and extending inwardly along the wall of said aperture and having a double-layered hook-like outer end, the inner layer of which hook bears against the outside of the cabinet adjacent the said aperture, and a C-shaped resilient clamp having its hook at one end projecting into the space between the said two layers of the hook-like outer end of the throat rubber and pressing said inner layer of the throat rubber against the outer face of the cabinet, the central portion of the clamp extending between the next adjacent part of the throat rubber and the wall of the aperture and the other or inner hooked end of the clamp being sprung into engagement with said face of said recess towards the outside of the cabinet, the resiliency of said clamp retaining said clamp and the outer end of said throat rubber in place.

5. In combination, a refrigerating cabinet having an aperture through one wall thereof, the inside face of said wall having a hook-engaging portion spaced from the adjacent outer face of the cabinet, a throat rubber extending about said aperture and extending inwardly along the wall of said aperture and having a double-layered hook-like outer end, the inner layer of which hook-shaped end bears against the outside of the cabinet adjacent the said aperture, and a C-shaped resilient clamp having its hook at one end projecting into the space between the said two layers of the hook-like outer end of the throat rubber and pressing said inner layer of the throat rubber against the outer face of the cabinet, the central portion of the clamp extending between the next adjacent part of the throat rubber and the wall of the aperture and the other or inner hooked end of the clamp being sprung into engagement with said hook-engaging portion, the resiliency of said clamp retaining said clamp and the end of the throat rubber in place.

DANIEL D. WILE.